W. G. CANION.
TRIPLE VALVE.
APPLICATION FILED JAN. 19, 1917.

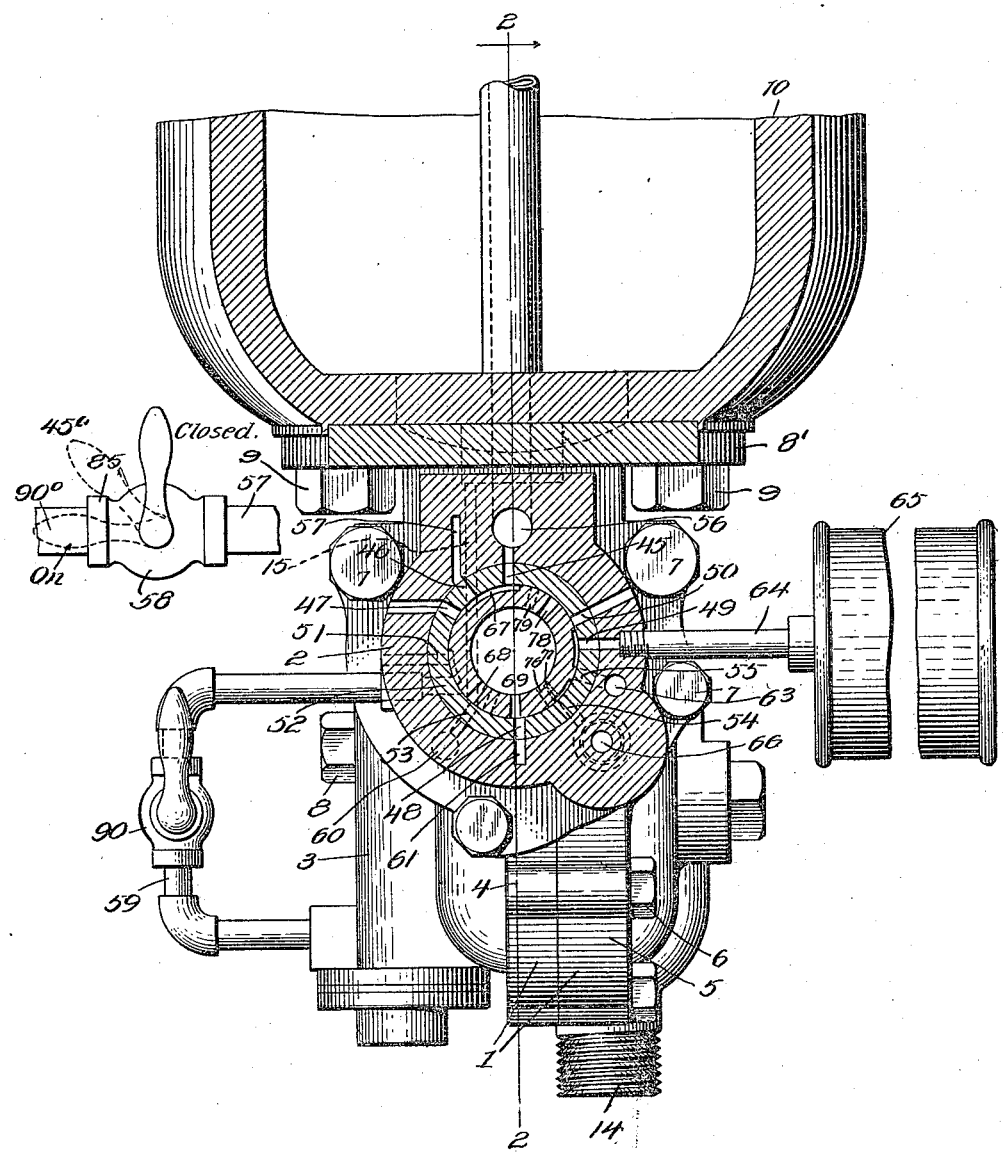

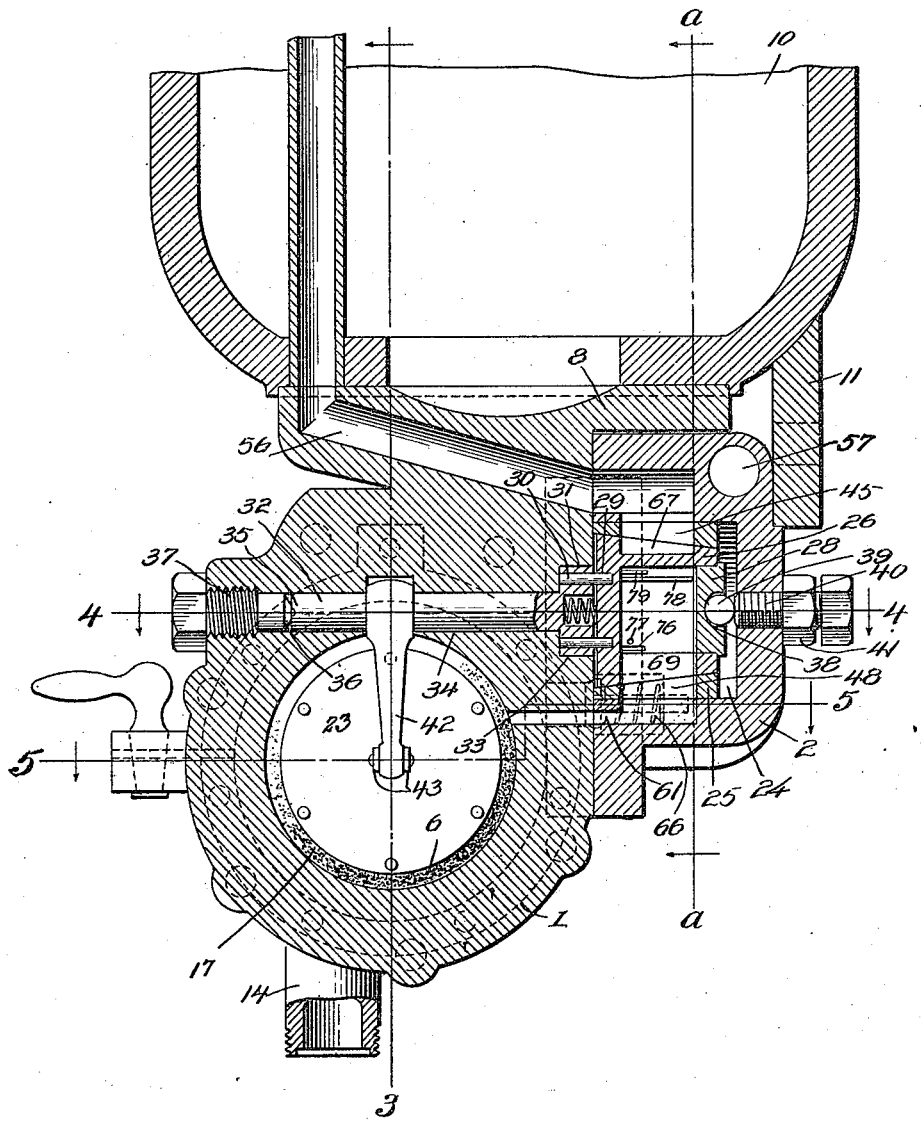

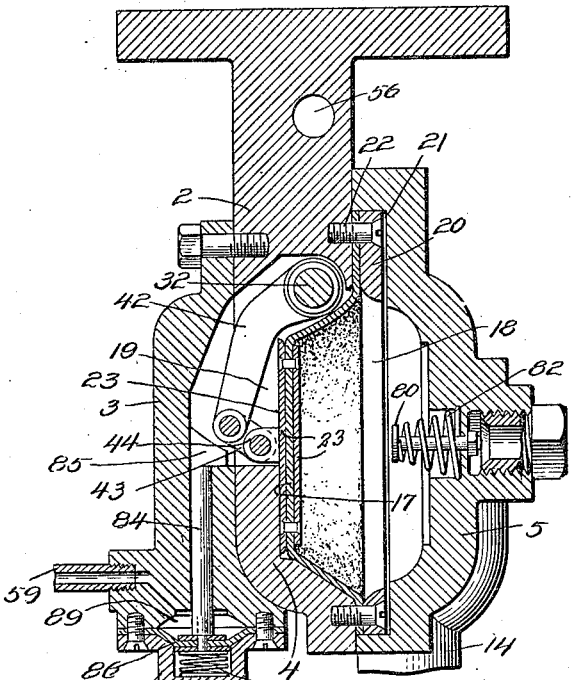
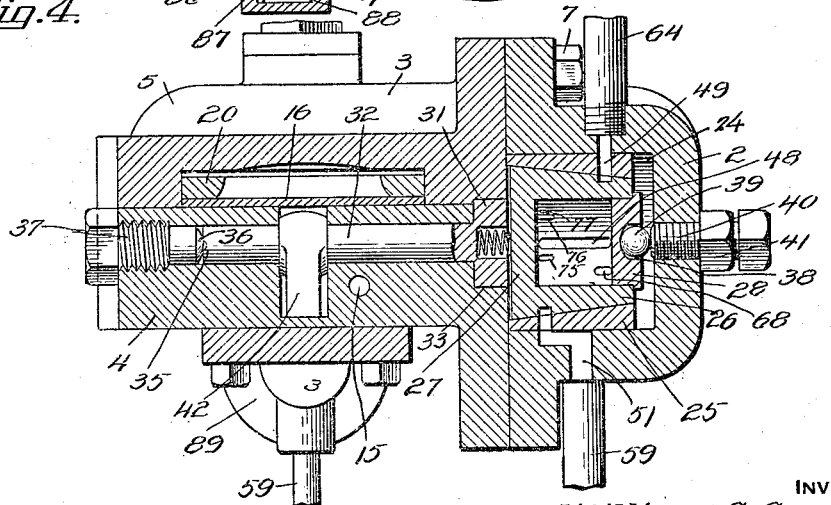

1,275,129.

Patented Aug. 6, 1918.
6 SHEETS—SHEET 4.

WITNESSES

INVENTOR
William G. Canion.

BY Victor J. Evans
ATTORNEY

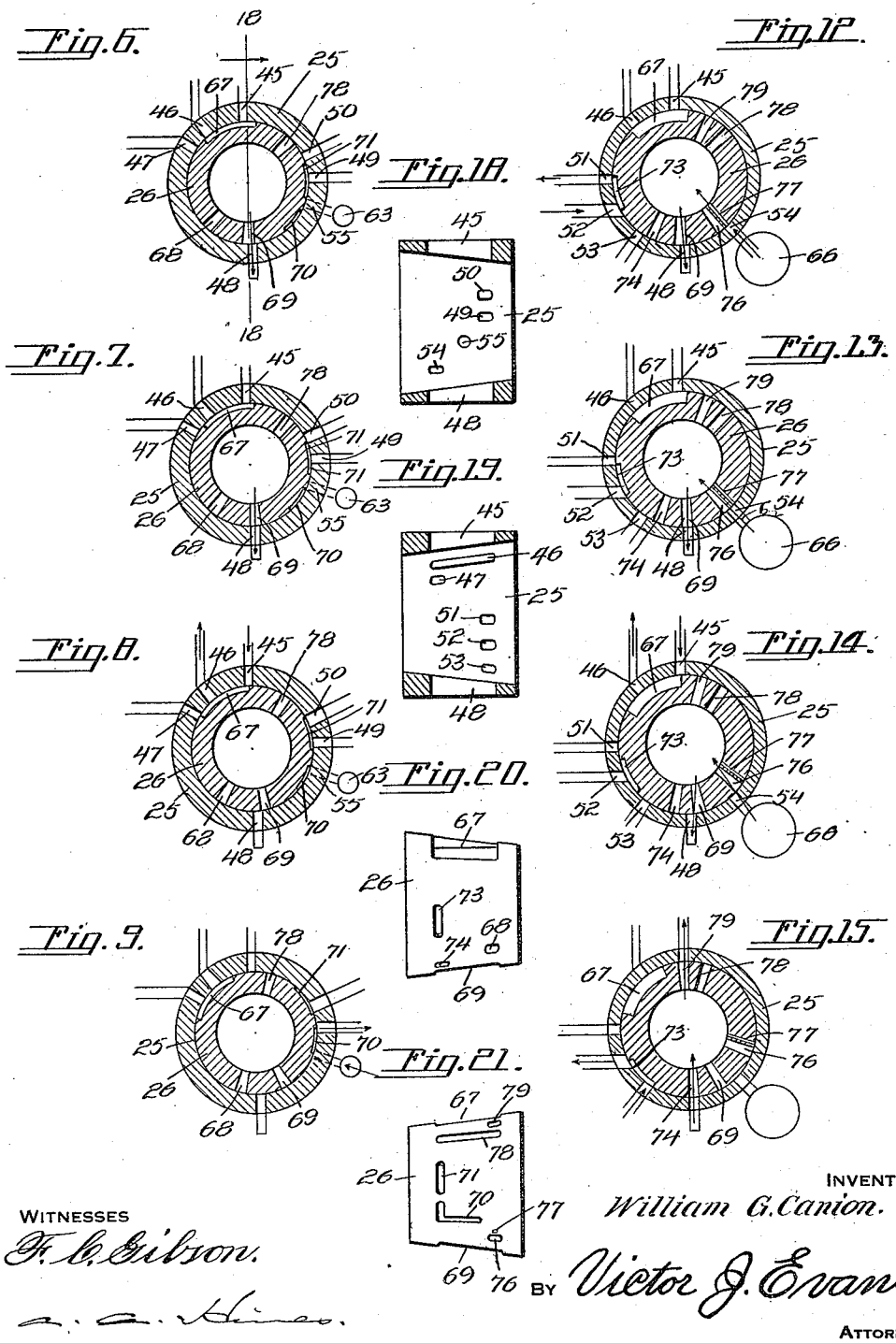

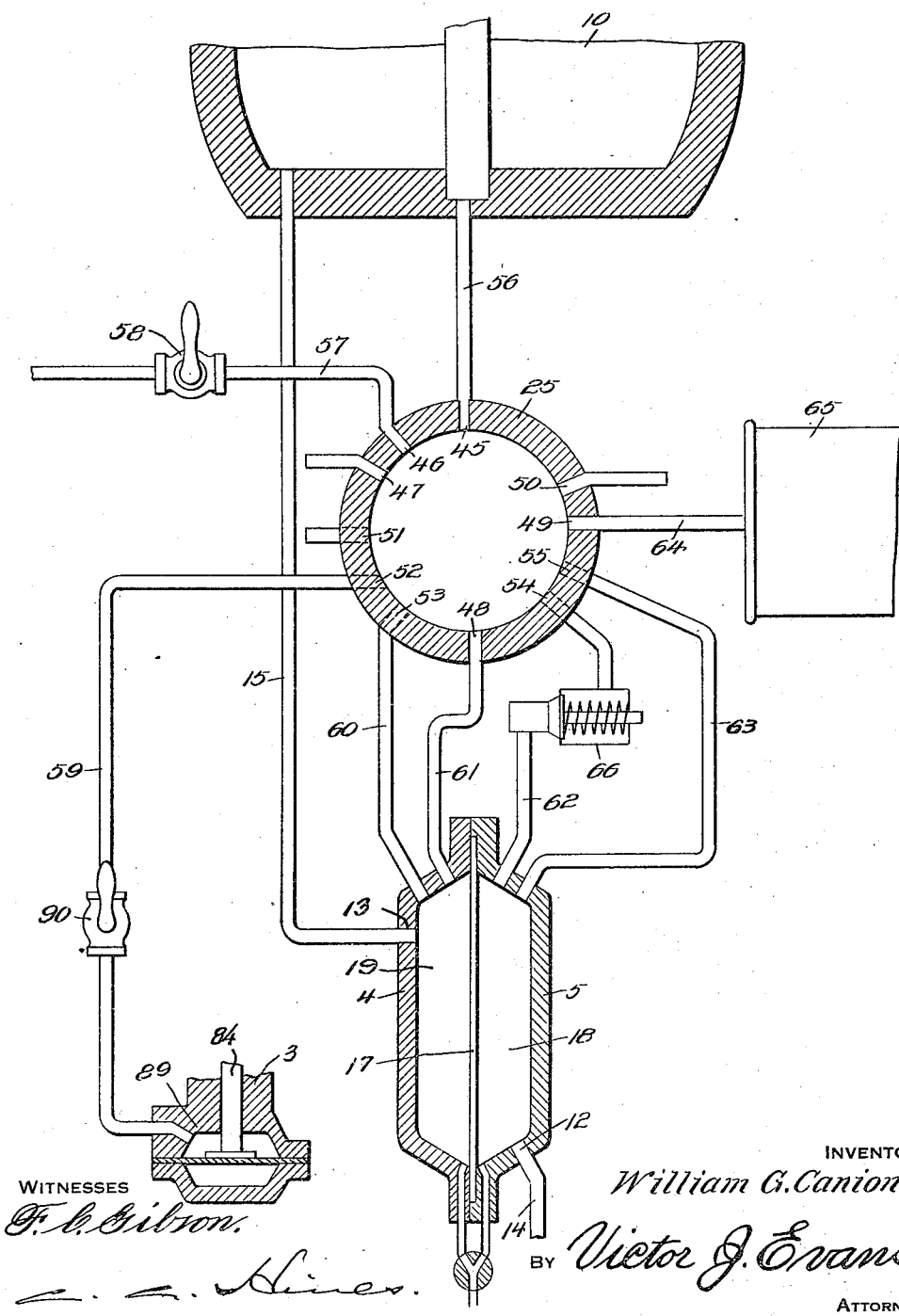

UNITED STATES PATENT OFFICE.

WILLIAM GEO. CANION, OF BALTIMORE, MARYLAND.

TRIPLE VALVE.

1,275,129.   Specification of Letters Patent.   Patented Aug. 6, 1918.

Application filed January 19, 1917. Serial No. 143,341.

*To all whom it may concern:*

Be it known that I, WILLIAM G. CANION, a citizen of the United States, residing at Baltimore, in the State of Maryland, have invented new and useful Improvements in Triple Valves, of which the following is a specification.

This invention relates to certain new and useful improvements in triple valves, and particularly to a rotary triple valve of the general type disclosed in my prior application filed June 7, 1915, Ser. No. 32,696.

The main object of the invention is to provide a triple valve of the rotary type which is adapted for performing any and all of the usual functions, which may be employed in any ordinary type of air brake system in conjunction with other triples, and which additionally is convertible at will from a plain triple, having the usual functions, to a triple having other and desirable functions to meet the varying requirements of general service conditions.

A further object of the invention is to provide a construction which enables a valve of the rotary type to be used with great efficiency, which insures great sensitiveness of action under all conditions of service, and which provides for the more reliable and complete control by the engineer of trains of varying lengths under ordinary running conditions and in descending grades.

With these and other objects in view, the invention consists of the features of construction, combination and arrangement of parts hereinafter fully described and claimed, reference being had to the accompanying drawings in which:—

Figure 1 is a sectional plan view of my improved triple valve, taken on line *a—a* of Fig. 2, showing also a portion of the auxiliary reservoir.

Fig. 2 is a vertical longitudinal section of the same on line 2—2 of Fig. 1.

Fig. 3 is a sectional plan view on line 3—3 of Fig. 2.

Fig. 4 is a vertical transverse section on line 4—4 of Fig. 2.

Figure 10:
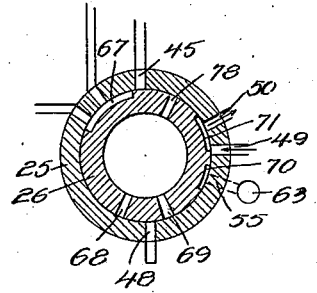

Figs. 6 to 11, inclusive, are horizontal sections through the valve and valve shell, taken on a line through the upper series of ports and passages, and showing the valve in different positions.

Figs. 12 to 17, inclusive, are similar sectional views of the valve and valve shell, taken on a line through the lower series of ports and passages.

Figs. 18 and 19 are vertical axial sections through the valve and looking toward opposite sides of the interior thereof.

Figs. 20 and 21 are elevational views looking toward opposite sides of the valve.

Fig. 22 is a diagrammatic view of the parts of the valve mechanism, showing particularly the ports and passages.

In carrying my invention into practice, I provide a valve structure including a casing composed of an air chest or pressure chamber 1, and valve chamber or casing proper 2, and a retarding casing or chamber 3. The pressure chamber 1 is divided on a vertical longitudinal line into two separable sections 4 and 5 united by screws or other suitable fastenings 6, and to said pressure chamber 1 are detachably secured the valve chamber 2 and the retarding chamber 3, by means of screws or other suitable fastenings 7 and 8, respectively. As shown, one of the sections, as the main section 4 of the pressure chamber is provided with a vertical flange or extension 8' which is detachably secured, as by screws or other suitable fastenings 9, to the adjacent end of the auxiliary reservoir 10. The valve chamber 2 is preferably in the form of a bonnet or cap which rests upon the top of the pressure chamber and extends under a flange or projection 11 on the auxiliary reservoir, whereby the parts of the valve are firmly secured in position upon said reservoir.

The pressure chamber 1 is provided in its opposite sides with ports or passages 12 and 13 for respective connection with the train pipe 14 and the auxiliary reservoir pipe 15, and these passages 12 and 13 communicate with the opposite sides of an intermediate pressure chamber in which is arranged a fluid pressure influenced element for operating the rotary valve. This element comprises a flexible diaphragm 17, which separates the chamber into compartments 18 and 19, see Figs. 3 and 5, communicating respectively with the ports 12 and 13, see Fig. 22, whereby the diaphragm is subjected within the compartment 18 to train pipe pressure and within the compartment 19 to auxiliary reservoir pressure. The marginal edge of the diaphragm is seated with a gasket 20 in a recess 21 in the section 5 of the air chest or pressure chamber, and is clamped by the gasket 20 against the adjacent face of the section 4 of the air chest, said diaphragm and gasket being secured in position by screws or other preferred fastenings 22. Secured to the center of the diaphragm, on opposite sides thereof are plates 23 forming a rigid vane, rendering the diaphragm sufficiently stiff to maintain its shape and to sustain the pressures falling thereon, said vane also serving as a means by which the diaphragm is connected with the rotary valve, for imparting motion to the latter, as hereinafter fully described. It will be observed that by removing the section 5 of the air chest access may be obtained to the pressure chamber for the purpose of cleaning the same or repairing or renewing any of the parts contained therein.

The valve casing 2 is provided with a chamber 24 to receive a valve shell or cage 25 and a rotary valve member 26, said shell or cage being firmly secured or fastened in position against movement and provided with a tapered bore to receive the valve 26, which is of the hollow tapered type. As shown, the valve is closed at its bottom by an integral head 27 and at its top by a cap or head 28, and said head 27 is provided in its underside with recesses 29 to receive dowel pins or coupling pins 30 projecting upwardly from a head or enlargement 31 formed upon the upper end of a stem or shaft 32 journaled upon the air chest section 4. The head or enlargement 31 is seated in a recess 33 in the upper face portion of the air chest below the valve, and the stem 32 extends downwardly therefrom and through a bore or passage 34 and is provided at its lower end with a conical recess 35 receiving the conical end 36 of a retaining and adjusting screw 37 closing the lower end of said bore, the construction being such that the shaft or stem may be accurately adjusted to raise or lower the valve and thus vary its seating action in the conical bore of the valve cage or shell.

The head 28 is formed with a recess 38 in which is fitted an anti-friction ball or bearing member 39 engaged by the end of an adjusting screw 40 fitted in the top of the valve casing and adapted to be held in adjusted positions by a check nut 41, such arrangement of the adjusting screws 37 and 40 and the bearing surfaces being such as to permit the valve to be adjusted upwardly or downwardly to an exceedingly accurate degree and retained in such adjusted position, while at the same time permitting it to have free rotary movement in the valve shell or cage. By this construction any tendency of the valve to wedge, stick or bind in the valve shell will be prevented, and the valve may be adjusted whenever necessary to accurately compensate for wear and to bind with just sufficient friction on the valve shell to prevent leakage. The valve may, therefore, be at all times kept in proper working condition, so as to be exceedingly sensitive in its action, while it may be seated within the shell so as to obviate any liability of its tendency to stick or bind under any and all conditions of service hence the valve will be responsive at all times in an exceedingly sensitive manner to variations of air pressure on the diaphragm, insuring its positive operation under all conditions of service. By mounting and adjusting the valve in the manner described the necessity of finely machining the contact surfaces of the valve and valve cage is avoided, thus materially reducing the cost of construction. Disposed within the compartment 19 of the air chest is a valve actuating lever or arm 42 which is fixed at one end to the shaft or stem 32 and is coupled at its opposite end by means of a link 43 to a lug 44 on the adjacent plate 23 of the diaphragm vane, whereby in the movements of the diaphragm by train line or auxiliary reservoir pressure responsive rotary movements in one direction or the other will be imparted to the valve 26.

The valve cage 25 is provided with an upper series of ports 45, 46, 47, 48, 49 and 50, a lower series of ports 51, 52, 53 and 54, and an intermediate port 55. The port 45 communicates with a pipe 56 leading to the brake cylinder, the port 46 with a pipe 57 leading to a retainer valve 58; the ports 47 and 51 with the atmosphere on the auxiliary reservoir pressure side, the port 52 with a pipe 59 leading to a retarder, hereinafter described, the ports 53 and 48 with passages 60 and 61 leading to the auxiliary reservoir compartment 17 of the air chest, and the ports 54 and 55 with passages 62 and 63 leading to the train line pressure compartment 18 of the air chest, the port 49 with a pipe 64 leading to a reduction reservoir 65, and a port 50 with a passage leading to the atmosphere on the train line pressure side. A check valve 66 of suitable construction is arranged in the passage 62 to close said passage against back pressure, while permitting train line air to flow, when the port 54 is opened, from the compartment 18 to the rotary valve.

The rotary valve 26 is provided in its upper portion with a series of ports and grooves for coöperation with the upper series of ports of the shell, and in its lower portion with a series of ports and grooves for coöperation with the lower series of ports of the shell. As shown the valve is formed in its upper portion with a circumferential groove 67 for coöperation with the ports 45, 46 and 47, a port 68 for coöperation with the port 48, a port 69 for coöperation with the port 48, a groove 70 for coöperation with the ports 49 and 55, and a groove 71 for coöperation with the ports 49 and 50. The valve is further formed in its lower portion with a groove 73, see Fig. 20, for coöperation with the ports 51, 52 and 53, a port 74, see Figs. 13, 15 and 20, for coöperation with the port 48, a port 69 for coöperation with the port 48, a pair of adjacent relatively large and restricted ports 64 and 79, for conjoint and independent coöperation with the port 48, a pair of adjacent relatively large and restricted ports 76 and 77, for conjoint and independent coöperation with the port 54, a port 78 for coöperation with the port 45, and a port 79 for coöperation with the port 45.

It is to be observed that the ports 45, 46 and 48 in the shell, and groove 67 and ports 69 and 78 of the valve are of comparatively large area or size, while the other ports and grooves are of more restricted size, the ports and grooves of comparatively large size being designed to secure rapid and free exhaust or release under some conditions, and retaining and retarding actions under other conditions in a reliable and sensitive manner. It will also be observed that the groove 70 is L-shaped, having a vertical portion and a lateral portion, in order to adapt said groove to connect the train-line port 55 with the individual reservoir port 49 under certain conditions. For convenience of description, the port 45 may be termed the brake cylinder feed and exhaust port, the port 46 a main or retainer exhaust port, the port 47 a secondary or direct exhaust port, the port 48 a recharge, application and emergency port, the port 49 the individual reservoir feed and exhaust port, the port 50 the atmospheric or final exhaust port for the individual reservoir, the port 51 the retarder chamber, exhaust port, the port 52 the retarder feed and exhaust port, the port 53 the lower feed port, to the retarded chamber from the auxiliary reservoir side of the air chest, the port 54 a primary train line feed port, and the port 55 a secondary train line feed port to the individual reservoir. The grooves and ports in the valve which coöperate with these sets or series of ports in the valve shell or cage may be correspondingly termed where the groove or port has a simple action, or combinedly termed where the groove or port coöperates with two or more ports in the shell for performing a plurality of functions or actions.

As stated, the triple valve is adapted to perform all of the ordinary functions of the triple valves in common use, and also to perform certain other functions increasing its range of operation, convenience and efficiency, all of which operations will be set forth in the following description of the mode of operation of the valve, reference being particularly called to Figs. 6 to 22, inclusive, showing clearly the construction of the valve shell and cage, the construction of the valve, and the arrangement of the ports and passages coöperating therewith.

Figs. 8 and 14 show the valve in a normal position, and by reference to these views it will be seen that the brake cylinder is in exhaust or release connection through the port 45, grooves 67 and ports 46 and 47 with the exhaust outlets, while the ports 69 and 76 are in restricted communication with the ports 48 and 54 to connect the auxiliary reservoir with the train line for recharging action to maintain normal pressures and to establish communication between the train pipe and auxiliary reservoir and the chambers 17 and 18 of the pressure controlled diaphragm, whereby said diaphragm will be normally subjected to equal opposing pressures, when the parts are in normal position and in normal conditions of service with the train line and auxiliary reservoir fully charged.

Figs. 9 and 15 show the position of the valve for service application of the brakes, which position is obtained by reducing the pressure in the train line to ordinary service application degree, with the result of causing a movement of the diaphragm in one direction under auxiliary reservoir pressure, whereby the valve will be adjusted to connect the train line port 55 through the groove 70 with the reduction reservoir 65 for the flow of the air into said reservoir for a rapid determined reduction, the movement of the valve causing the blanking of the port 45 with respect to the exhaust groove 67, the registration of ports 45 and 79 for the flow of auxiliary reservoir air to the brake cylinder via registering ports 48 and 74, the groove 73 in this position of the valve connecting the ports 52 and 53 for the flow of air from the auxiliary reservoir side of the pressure chamber to the retarder in the event that the latter is employed, as hereinafter described.

Figs. 7 and 13 show the position of the valve for an ordinary recharging action, from which it will be seen that the brake cylinder is connected with the exhaust ports 45 and 46 through the groove 67 for a release action, while the auxiliary reservoir is connected through the ports 48 and 69, 54 and 76 and fully with the train line through both recharging ports 76 and 77, so that the auxiliary reservoir may be recharged under normal conditions with air to working pressure within a given time.

Figs. 6 and 12 show the position of the valve for a retarding recharging action from which it will be seen that the position of the valve is the same as in Figs. 7 and 13, as concerning the release, and with the exception that the port 77 partially registers with the port 54 for a restricted flow, while the port 76 is moved out of register with the port 54 and the restricted port 77 is in communication solely with said port 54, for the restricted supply of air from the train line to the auxiliary reservoir, whereby a retarded recharging action is obtained. In Fig. 7 it will be seen that the reduction reservoir is in full communication with its exhaust outlet for the discharge of air taken from the train line to the atmosphere, while in Figs. 6 and 9 this connection is entirely cut off for obvious reasons.

Figure 16:
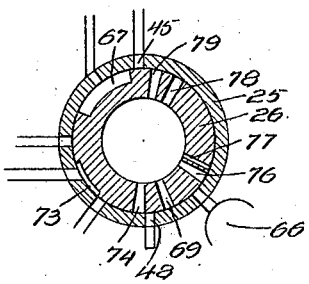

Figs. 10 and 16 show the lap position of the valve for cutting off the feed of air from the train line, maintaining the pressure in the brake cylinder and permitting exhaust of the air from the reduction reservoir to the atmosphere until completed. In this position it will be seen that the connections between the train line and auxiliary reservoir and the brake cylinder are cut off, the combined feed and exhaust port 45 closed, and the ports 49 and 50 connected to allow the air to continue to flow from the reduction reservoir to the atmosphere through the groove 71 after movement of the valve from application to lap position.

Figure 11:
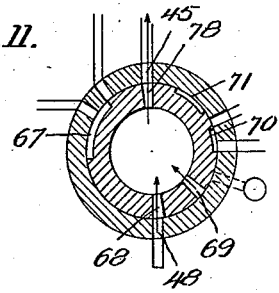
Figure 17:
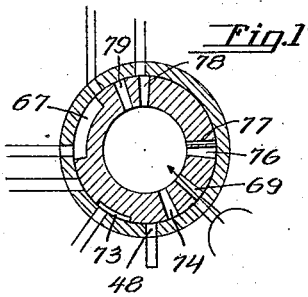

Figs. 11 and 17 show the position of the valve for an emergency action, in which air is admitted to the brake cylinder directly from the train pipe as well as from the auxiliary reservoir. In this position of the valve it will be seen that the ports 45 and 48 are in communication through the valve ports 78 and 69, while the port 45 is also in communication with the train line port 54 through the ports 78 and 76, from which the operation will be readily understood.

It will be evident from the foregoing description that the valve is adjusted to its different working positions mentioned by variations of pressure on opposite sides of the diaphragm 16, any variation from an equalization of pressures on both sides of said diaphragm, subjected to train line and auxiliary reservoir pressures, whether due to leakage or a reduction of pressure in the train line by the engineer's brake valve causing, through the operating connections, an immediate responsive action of the valve proportionate to the degree of reduction, whereby an automatic action of the valve to effect the desired function is obtained. It will be evident that as the valve is sensitively mounted for operation it will respond to slight air pressure variations, thus obviating liability of the valve sticking or becoming bound or requiring more than the ordinary pressures to operate it under different conditions, so that all of the valves of the brake mechanism of the cars on even a very long train will operate in substantial accord and without liability of causing irregular actions, dynamiting or other troubles produced by irregular and faulty triple valve actions. The improved valve embodying my invention will operate with great efficiency in any ordinary air brake system in common use with other valves of various types, and by reason of its construction and improved features used in connection therewith will reduce to a material extent faulty actions of other valves, due to conditions to which valves of ordinary construction are unable to respond and to functions obtainable by the use of my improved valve for which other valves are not designed or adapted.

Figure 5:
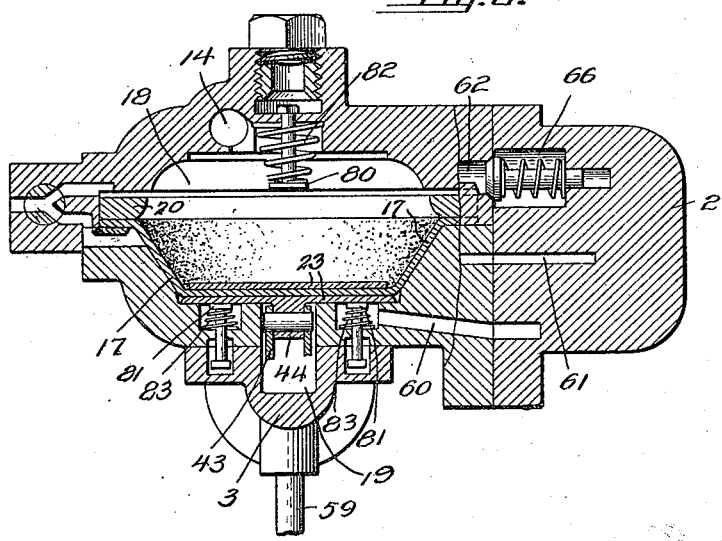
Fig. 5 is a vertical transverse section on line 5—5 of Fig. 2.

Bumpers 80 and 81 are respectively provided in the train line and auxiliary reservoir sides of the pressure chamber to cushion the reverse movements of the diaphragm, said bumpers being respectively backed by cushioning springs 82 and 83. These springs serve to prevent unduly rapid or violent motions of the diaphragm in its opposite movements, the bumpers 80 properly checking and limiting the motion of the diaphragm on extreme reductions for an emergency action, while the bumpers 81 cushion the movement of the diaphragm on its return to the normal position which it occupies as shown in Figs. 3 and 5.

The exhaust ports and passages are preferably of comparatively wide area to provide for rapid release when desired, and for controlling the exhaust of the air from the brake cylinder to the atmosphere and establishing a retaining action when desired. I provide within the pipe 57 the retaining valve 58. The handle of this valve is adjustable to a 45 degree angle for a wide opening action, to obtain an extra quick exhaust and release, which is desirable when the valve is used on interurban lines, and is adjustable to an angle of 90 degrees, or partially open position, for a plain release in connection with the primary exhaust port, thus making the exhaust in such case of the same area as in other triple valves, thus allowing either an extra quick or a plain release to be obtained by simple adjustment of the retaining valve to the stated positions, as such valve coöperates with both the primary and secondary exhaust ports. For the purpose of controlling the travel of the diaphragm toward the auxiliary reservoir side, I provide a controlling and retarding device, whereby variable actions of the diaphragm may be obtained to adapt the valve for an efficient action at any point in a long train and to enable a more efficient recharging action to be obtained. To this end, a controller is provided consisting of a reciprocating member or stem 84 slidably mounted in the casing 3 and having at one end an abutment head 85 provided with an inclined or cam surface to lie in the path of movement of the end of the arm 42 pivoted to the diaphragm, whereby the diaphragm may be permitted to have either full or a limited degree of travel toward the auxiliary reservoir side of the pressure chamber. The outer end of the rod or stem 84, see Fig. 22, is connected with a retarding or controlling diaphragm 86 disposed within a pressure chamber 87, said diaphragm being subjected on one side to the pressure of a spring 88 and on its opposite side to the pressure of air within a chamber 89, communicating with the pipe 59, and within which is arranged a controlling and retainer valve 90. As cavity 89 communicates through the pipe 59 with the port 52, when the valve 90 is open, and said port 52 is in communication through the port 53, and groove 73 with the auxiliary reservoir, it will be evident that the diaphragm 86 may be subjected to auxiliary reservoir pressure to move it in one direction against the resistance of the spring 88. Normally communication between said cavity and the auxiliary reservoir is closed, and the spring 88 projects the member 85 forward into the path of the arm 42 and limits the travel of the diaphragm toward the auxiliary reservoir side of the air chest, which is the position of the parts in the ordinary use of the valve. By turning the valve 26 to application position it allows air to pass into said cavity for action on the diaphragm 86 to retract the head 85 whereupon the diaphragm 16 will be permitted to have an extended range of movement toward the auxiliary reservoir side of the air chest. When the valve 26 is returned to full retarded position, as shown in Figs. 6 and 12, this pressure on the diaphragm 86 will be exhausted, allowing the stem 84 to be returned within the path of the arm 42 by the action of spring 88.

The improved valve herein described is not only adapted for interchange with other triples, and for the ordinary service, emergency and graduated release actions, but by being sensitively mounted to operate with a minimum degree of friction, may be made of sufficiently great area to provide for all the ports and passages necessary as described without a material amount of fine machining and without liability of sticking, since the surfaces of the valve and its cage may be made to contact with just sufficient friction to prevent leakage while obviating all liability of any wedging or binding action. Such a sensitive type of valve is admirably adapted for use in conjunction with a pressure controlled diaphragm of the character described, so that very fine motions and equalizing actions may be obtained, making possible the use of a secondary exhaust port in addition to a primary exhaust port controlled by a retaining valve which forms a direct element of the valve structure, thus eliminating the use of the usual piping to retainer valves and permitting of the retention of full pressure in the brake cylinders while the train line is recharging, and consequently obviating the necessity of maintaining brakemen on duty for hand braking.

The valve can be converted from a rapid to a plain release valve by setting the handle of the retainer valve to different degrees, and is adapted, even when converted to a slow release valve by the retainer valve being closed, to permit the engineer, by manipulations of the engineer's brake valve, to control the triple to release partly, and slowly, quickly or to graduate off. By means of the valve 90 and the retarder the triple valve is also rendered adjustable for use at any point in a long train, since if this valve 90 is left open, it is in the retarded recharge position subject to automatic, but temporary recharge back to ordinary recharge at the will of the engineer. With valve 90 closed, air is prevented from reaching the diaphragm chamber 89, and therefore the head 85 remains a permanent abutment for the valve arm 42, so that the triple in this state of adjustment remains an ordinary recharge triple, wherein the diaphragm 16 is prevented from having more than its preliminary traverse toward the auxiliary reservoir side of the pressure chamber, with the effect of controlling the action of the triple, as hereinafter fully set forth.

When an extra quick release action is desired, the valve 58 is set at a 45 degree angle, and as this affords the largest exhaust port the most rapid release will be obtained through it. When interchanging it is necessary to have the plain release exhaust port the same size as the exhaust ports in other triples. To obtain this plain release the handle of valve 58 is turned to a 90 degree angle position, whereby the exhaust from the main or primary exhaust port 46 will be controlled and plain release obtained by connection of said port with the open retainer valve. When the handle of valve 58 is set at zero approximately 96% of the pressure is retained in the brake cylinder until the train line is recharged, or until the engineer's brake valve is placed on lap, which allows the reservoir side to equalize with the train line. In either case the spring bumpers 81 will move the diaphragm 16 toward the train line pressure side approximately three-eighths of an inch travel, thus connecting ports 45 and 67 with port 47 for an exhaust action. The retaining valve 58 in this type of triple is also found to have, when closed, an extraordinary safety function for cases where the engineer has exercised poor judgment and allowed the train to get beyond maximum speed on mountain grades, or the train is heavier than usual from snow or ice and difficult to control and is carried forward by a heavy wind. Under these circumstances, and particularly when the piston travel of ordinary valves has been neglected and is longer than usual, the closure of the valve 58 for a retaining action is very valuable and serviceable for the following reasons. When the engineer applies the brakes under the conditions mentioned, the equalization between reservoir, brake cylinder and train line is about 50 pounds. In close places this is insufficient braking pressure to stop the train within anything like a reasonable distance. By however closing the valve 58, with the present type of triple, and placing the engineer's valve in release position, preferably immediately after applying the brakes, and when the pressure has increased to 70 pounds, the brake cylinder pressure having been retained, the valve is again placed in heavy service position, the equalization this time being approximately 60 pounds. If the train is yet stubborn the brake valve is again placed in recharge position and, without releasing the brakes, the train line and auxiliaries are again charged to the maximum pressure and the third service reduction is made. This time the brake cylinders and train line will equalize close to 65 pounds. Thus the braking efficiency can be increased in cases of extreme demand.

The retarding mechanism herein described insures the proper operation of the valve in conjunction with the retainer 58 under the conditions mentioned in the use of the triple on long trains, the control of the diaphragm 16 by the retarding mechanism enabling such functions to be obtained. It will be understood that the valve 90 is merely a cut-in and cut-out cock governing the admission of air to the diaphragm chamber 89, and that the head 85 acts as an abutment under certain conditions to control the operation of the diaphragm 16 and the valve actuating arm.

When a reduction in train line air is made, the diaphragm is moved forward, which changes the position of valve 26 and moves vent 73 around until ports 53 and 52 are connected, at which time air from the auxiliary side of diaphragm 16 rushes around through valve 90 into chamber 89. This depresses the stem 84 and head 85 clear of the arm 42, so that said arm 42 is allowed to have full travel, the valve 26 thus being moved to an abnormal degree to close the ordinary recharge port 76 and open the small recharge port 77. The air then feeds from the train line through the check valve and valve 26 back through ports 48 and 69, thence downwardly into auxiliary reservoir side of the diaphragm pressure chamber, and thence on a direct course to the auxiliary reservoir. When the retaining valve 58 is closed and the retarded recharge valve 90 is opened, the valve 26 is converted to a long train position by the manipulation of the engineer's valve. When the engineer's valve is placed in recharged position, recharge is retarded on the forward end of the train and release is prevented by valve 58 being closed. This condition is maintained until the train line is fully recharged or until the engineer brings his valve back to lock position, which cuts off the flow of air to the train line and allows the air to equalize on both sides of the diaphragm in either triple, at which time bumper springs will move the diaphragm forward to normal position and open the release to the atmosphere. The ordinary recharge to the auxiliary side is also opened. The retarded discharge action afforded by port 77 is of advantage in extremely long trains, and is made possible by withdrawing the head 85 out of the path of movement of the arm 42, allowing the diaphragm 16 to have an extended traverse or range of motion. When the air is exhausted from the chamber 89 the spring 88 will return the stem 84 and head 85 to normal position, thus moving said head into the path of the arm 42 to limit the movement of the diaphragm 16 for normal traverse toward the auxiliary reservoir side of the pressure chamber. When the train line and auxiliary reservoir pressures have equalized through port 77 the spring bumpers 81 will move the diaphragm forward, allowing the head 45 to continue to its full travel. In case the train line pressure should then be increased the head 85 will form an abutment for the arm 42, limiting its motion and preventing movement of the valve 26 sufficient to close the ordinary recharge port 76. Hence it will be seen that while the valve 26 has a normal range of action to perform the ordinary functions stated, it also has an additional range for retaining and retarding actions, by simply opening the valve 90. The use of the retarder in conjunction with the ordinary retainer 58 will also enable the braking pressure to be retained and controlled at all times by the engineer, to safely govern heavy trains and those descending heavy grades without the necessity of maintaining brakemen on duty on the tops of the cars for hand braking action.

I claim:—

1. A triple valve including a casing, a hollow ported valve therein controlling ports and passages for performing ordinary triple valve functions, and positively actuated pressure controlled means subjected to train line and auxiliary reservoir pressures for operating and controlling said valve.

2. A triple valve including a casing, a hollow rotary valve having ports and passages therein, and controlling ports and passages in the casing for performing ordinary triple valve functions, and pressure controlled means subjected to train line and auxiliary reservoir pressures for operating and controlling said valve.

3. A triple valve including a casing, a valve therein having a normal range of motion to perform ordinary triple valve functions, and having an extended range of motion for performing retarding and recharging functions, and positively actuated pressure controlled means for operating and governing said valve for ordinary and extended ranges of action.

4. A triple valve including a casing, a rotary valve therein having an ordinary range of motion for ordinary triple valve functions, and an extended range of motion for retaining and retarding functions, a pressure controlled element for actuating the valve, said element being governed by opposing train line and auxiliary reservoir pressures, and means governing said pressure controlled element to adapt the valve to have ordinary or extended ranges of motion.

5. A triple valve including a casing, a valve having a normal range of motion for performing ordinary triple valve functions, and an extended range of motion for performing recharging and retaining functions, a diaphragm for actuating said valve, said diaphragm being subjected to opposing train line and auxiliary reservoir pressures, and means for controlling the motion of said diaphragm.

6. A triple valve including a casing, a rotary valve having a normal range of motion for performing ordinary triple valve functions, and an extended range of motion for performing retaining and recharging functions, a diaphragm operatively connected with said valve for controlling the same, said diaphragm being subjected to opposing train line and auxiliary reservoir pressures, means movable into and out of the path of motion of said diaphragm for permitting the same to have normal and extended ranges of motion, and means for controlling the aforesaid means.

7. A triple valve including a casing, a valve therein having a normal range of motion for performing ordinary triple valve functions, and an extended range of motion for performing retaining and recharging functions, said valve being provided with a plurality of exhaust ports and a plurality of differently dimensioned recharging ports, a pressure controlled element subjected to opposing train line and auxiliary reservoir pressures for operating said valve, means for limiting the movement of the said element for normal actions, and means for rendering the aforesaid means inoperative to adapt said pressure controlled element to govern the valve in its extended movements.

8. A triple valve including a casing having primary and secondary exhaust ports, a pressure retaining valve communicating with the primary exhaust port and adjustable to full and partly opened positions, a valve operative in conjunction with said ports for performing ordinary triple valve functions, and having an extended range of motion for performing retaining and recharging functions, and fluid pressure retarding means operative for adjusting the valve for retaining and recharging actions, and also for performing ordinary service functions.

9. A triple valve including a casing, a retainer controlling the exhaust from said casing, said retainer being adjustable to full and partial exhaust positions, a valve operative for performing ordinary triple valve functions and recharging and retaining functions, a diaphragm for operating the valve subjected to opposing train line and auxiliary reservoir pressures, means movable into the path of the diaphragm for normally limiting its movements to adapt the valve to perform ordinary triple valve functions, pressure controlled means in communication with the air system through the valve for operating said member, and a controlling valve in the line of the connection.

10. The triple valve including a casing, a valve controlling ports and passages for performing ordinary triple valve functions, a pressure controlled device subjected to opposing train line and auxiliary reservoir pressures for operating said valve and means for automatically balancing the valve within the valve casing.

11. The triple valve including a casing, a valve controlling ports and passages for performing ordinary triple valve functions, a pressure controlled device subjected to opposing train line and auxiliary reservoir pressures for operating said valve and means including a cushioning connection for automatically balancing the valve within the casing.

12. The triple valve including a casing, a valve controlling ports and passages for performing ordinary triple valve functions, a pressure controlled device subjected to opposing train line and auxiliary reservoir pressures for operating said valve and means including an adjustable ball bearing positioned axially of the valve for automatically balancing said valve within the casing.

In testimony whereof I affix my signature.

WILLIAM GEO. CANION.

Copies of this patent may be obtained for five cents each, by addressing the "Commissioner of Patents, Washington, D. C."